Oct. 2, 1962 W. C. ESPENLAUB 3,056,853

MATRIXING APPARATUS FOR COLOR-TELEVISION SIGNALS

Filed Nov. 8, 1954 2 Sheets-Sheet 1

Oct. 2, 1962 W. C. ESPENLAUB 3,056,853

MATRIXING APPARATUS FOR COLOR-TELEVISION SIGNALS

Filed Nov. 8, 1954 2 Sheets-Sheet 2

United States Patent Office 3,056,853

Patented Oct. 2, 1962

3,056,853
MATRIXING APPARATUS FOR COLOR-TELEVISION SIGNALS

Walter C. Espenlaub, Syosset, N.Y., assignor to Hazeltine Research, Inc., Chicago, Ill., a corporation of Illinois Filed Nov. 8, 1954, Ser. No. 467,466
11 Claims. (Cl. 178—5.4)

*General*

Figure 1:
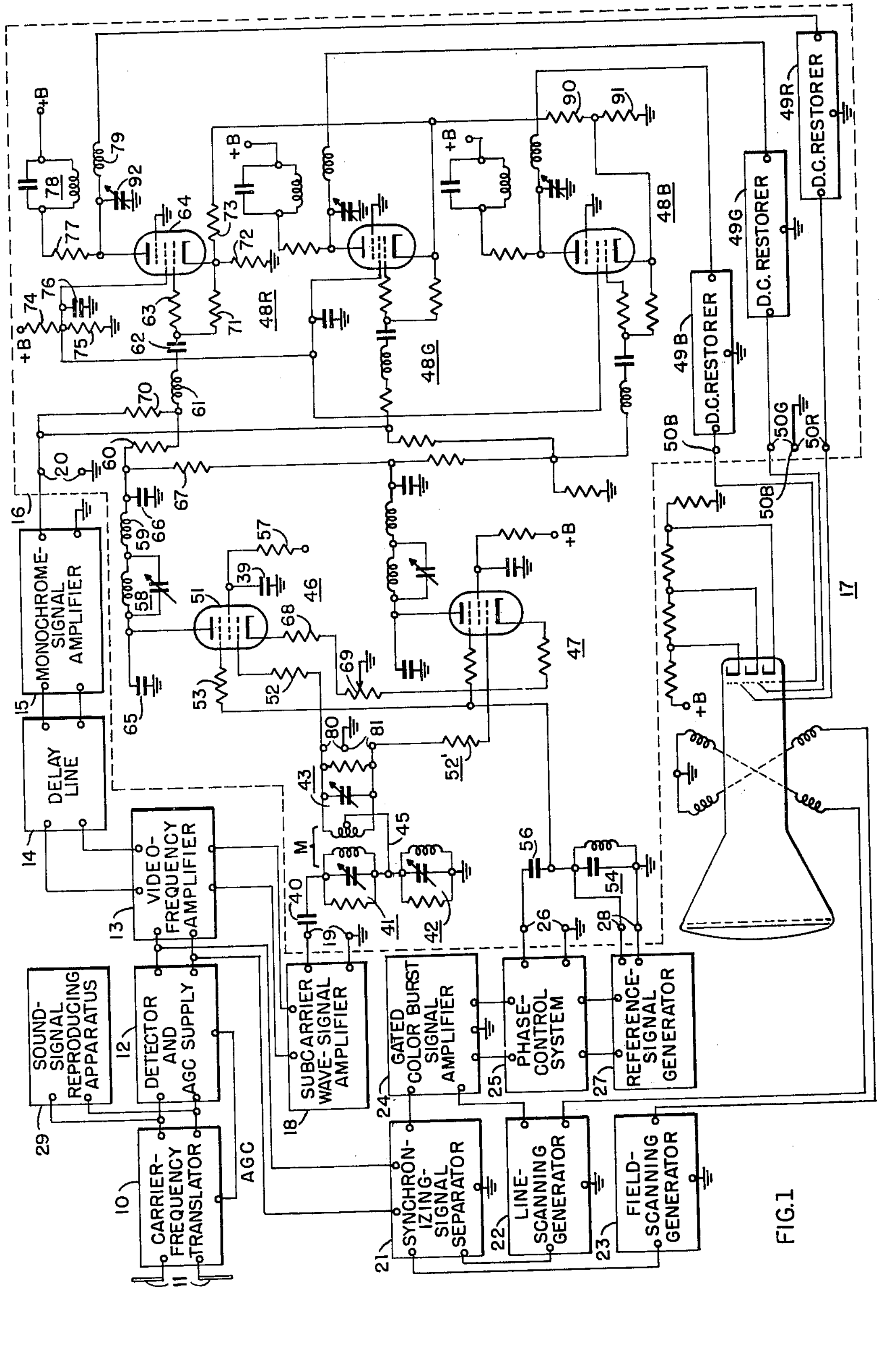

The present invention is directed to matrixing apparatus for color-television signals and, particularly, to such apparatus in color-television receivers for developing from a pair of signals individually representative of unlike colors of a televised image, three signals representative of unlike colors of the aforesaid image.

In a form of color-television system more completely described in an article in "Electronics" for February 1952, entitled "Principles of NTSC Compatible Color Television," at pages 88–95, inclusive, information representative of a scene in color being televised is utilized to develop at the transmitter two substantially simultaneous signals, one of which is primarily representative of the luminance and the other representative of the chrominance of the image. To develop the latter signals, the scene being televised is viewed by one or more television cameras to develop color signals individually representative of such primary colors as green, red, and blue of the scene and these signals are combined in a manner more fully described in the aforesaid article to develop a signal which primarily represents all of the luminance or brightness information relating to the televised scene. Additionally, these color signals or signals representative thereof are individually applied as modulation signals to a subcarrier wave signal developed at the transmitter, effectively to modulate the latter signal at predetermined phases thereof to develop the signal representative of the chrominance of the scene being televised. Conventionally, the modulated subcarrier wave signal or chrominance signal has a predetermined frequency less than the highest video frequency, for example, a frequency of approximately 3.6 megacycles, and has amplitude and phase characteristics related to the saturation and hue of the color being transmitted. In the specific form of such system, as described in the aforementioned article, the three color signals are initially modified to become at least two color-difference signals, in other words, to become signals such that when they are individually added in a receiver to the luminance signals, color signals will be developed. Such color-difference signals are usually, but not necessarily, limited in band width to less than 2 megacycles and different ones thereof may have different band widths. The color-difference signals are utilized to modulate the subcarrier wave signal at quadrature phases thereof. In one embodiment of such system, which will be considered more fully hereinafter, the phase axes of such quadrature signals do not coincide with any of the three phase axes of the signals representative of the primary colors in the system as such signals inherently occur as modulation components of the subcarrier wave signal. It has become conventional to designate the quadrature signals as I and Q signals and the color-difference signals as $G-Y$, $R-Y$, and $B-Y$ signals, the latter three signals representing, respectively, the green, red and blue colors of the image. It has been found that the eye has less acuity for details in the colors represented by the components on the Q axis while having greater acuity for details in the colors represented by the components on the I axis. Therefore, the quadrature signal I is usually proportioned to have a band width of approximately 1.3 megacycles, while the signal Q has a narrower band width of approximately 0.6 megacycle. After the modulated subcarrier wave signal including the I and Q signals as modulation components has been developed, the latter wave signal is combined with the luminance signal in an interlaced manner to form, in a pass band common to both signals, a resultant composite video-frequency signal which is transmitted in a conventional manner. Because of the 3.6 megacycle frequency of the subcarrier wave signal and a video-frequency range of only 0–4.2 megacycles, the Q component can be translated as a double side-band modulation component but at least a higher frequency portion of the I component is translated only as a single side-band component.

A receiver in such a television system intercepts the transmitted signal and initially derives therefrom the chrominance signal and the luminance or brightness signal. The quadrature-modulation components of the chrominance signal, specifically, the L and Q signals, are derived by a detection means which is designed to operate in synchronism and in proper phase relation with the subcarrier wave-signal modulating means at the transmitter. Because of the single side-band translation of the higher frequency I components, quadrature cross talk of these components may occur in the channel for translating the derived Q components. To minimize this effect the latter channel has a pass band wide enough for translating substantially only the double side-band components, that is, a pass band of substantially 0.6 megacycle. In view of the lack of coincidence between the quadrature-phase axes of the I and Q signals and the phase axes of the three color-difference signals as modulation signals of the subcarrier wave signal, the detection means further comprises a signal-combining circuit for combining components of the derived wider band width I and narrower band width Q signals to develop the color-difference signals $G-Y$, $R-Y$, and $B-Y$. The color-difference signals, desirably including primarily chrominance information, and the derived luminance signal are combined to develop color signals individually representative of the green, red, and blue of the televised image. After being effectively combined, these color signals are utilized in an image-reproducing apparatus to cause this apparatus to develop a color reproduction of the televised scene.

Many matrixing circuits have been proposed for developing the $R-Y$, $B-Y$, and $G-Y$ color-difference signals from the I and Q signals. In one such proposed circuit, a pair of phase splitter circuits are employed to develop $\pm$I and $\pm$Q components and then appropriate relative amounts of the latter components are matrixed in the input circuits of three amplifiers to develop the $R-Y$, $B-Y$, and $G-Y$ components individually in the different output circuits of such amplifiers. In order to minimize undesired cross coupling in the different input circuits, feed-back circuits are coupled between the input and output circuits of each amplifier. Such matrixing circuit tends to be expensive in requiring phase splitter circuits in addition to the three amplifier circuits and tends to have low gain due to the feed-back circuits. Another matrixing circuit employs three amplifiers with $R-Y$ and $B-Y$ color-difference signals individually applied to the input circuits of a pair of the amplifiers and the output circuits of such pair of amplifiers, in addition to including the $R-Y$ and $B-Y$ color-difference signals, are cross coupled to develop a $G-Y$ color-difference signal which is applied to the input circuit of the third amplifier. The latter matrixing circuit is deficient in having delay for the $G-Y$ output signal with respect to the $R-Y$ and $B-Y$ output signals and in having reduced gain due to the cross coupling of the output circuits of the $R-Y$ and $B-Y$ amplifiers. Matrixing apparatus in accordance with the present invention utilizes a minimum of circuits to effect the development of desired color signals with adequate gain.

It is, therefore, an object of the present invention to provide a new and improved matrixing apparatus for color-television signals which does not have the disadvantages and limitations of prior such apparatus.

It is also an object of the invention to provide a new and improved matrixing apparatus for color-television signals which includes a small number of circuit elements to accomplish its purpose.

It is a further object of the invention to provide a new and improved matrixing apparatus for color-television signals with higher gain than prior such apparatus.

In accordance with the present invention, therefore, there is provided a matrixing apparatus for color-television signals comprising means for supplying a pair of signals individually representative of unlike colors of an image and a plurality of electron-discharge devices each having at least three electrodes of different species. The apparatus also includes means for applying the aforesaid pair of signals individually to different ones of those electrodes comprising one of the aforesaid species and passive circuit means, including an impedance network cross coupling those of the aforesaid electrodes comprising another of the aforesaid species, for developing from predetermined proportions of the applied signals at one of the electrodes of the aforementioned other species another signal representative of another color. Finally, the matrixing apparatus includes a plurality of output circuits individually coupled to different ones of those of the electrodes comprising a third of the species for developing in the output circuits output signals individually representative of different ones of three unlike colors of the image.

For a better understanding of the present invention, together with other and further objects thereof, reference is had to the following description taken in connection with the accompanying drawings, and its scope will be pointed out in the appended claims.

Figure 2A:
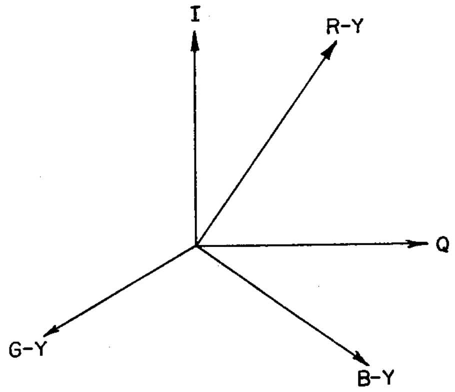
Figure 2B:
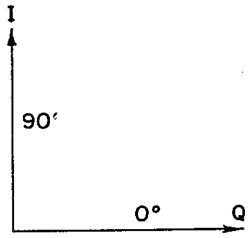
Figure 2C:
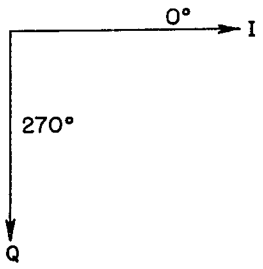

Referring to the drawings:

FIG. 1 is a circuit diagram, partially schematic, of a color-television receiver having a color-signal translating system including a matrixing apparatus in accordance with the present invention, and FIGS. 2*a*, 2*b*, and 2*c* are graphs utilized in explaining the operation of the matrixing apparatus of FIG. 1.

*General Description of Receiver of FIG. 1*

Referring now to FIG. 1 of the drawings, there is represented a color-television receiver of the superheterodyne type such as may be used in a color-television system of the type previously discussed herein and in the aforesaid "Electronics" article. It is preferable, though not essential, that properly developed luminance and chrominance signals, which will be considered more fully hereinafter, are utilized in such a television system. The receiver includes a carrier-frequency translator 10 having an input circuit coupled to an antenna system 11. It will be understood that the unit 10 may include in a conventional manner one or more stages of wave-signal amplification, an oscillator-modulator, and one or more stages of intermediate-frequency amplification if such are desired. Coupled to the output circuit of the unit 10 in cascade, in the order named, are a detector and automatic-gain-control (AGC) supply 12, a video-frequency amplifier 13, a delay line 14, a monochrome-signal amplifier 15, a matrixing apparatus 16 in accordance with the present invention having input terminals 20, 20 and output terminals 50B, 50G, and 50R, which will be described more fully hereinafter, and an image-reproducing device 17.

The amplifiers 13 and 15 are conventional wide-band units for amplifying signals having a maximum band width of approximately 0–4.2 megacycles. For some purposes, the band width of the amplifier 15 may be limited to an upper frequency of approximately 3 megacycles. The delay line 14 may be of conventional construction for delaying the translation of the signals applied thereto so that the time of travel of such signals is equal to the time of travel of the chrominance signals through the chrominance channel. The image-reproducing device 17 is conventional and may, for example, comprise a single cathode-ray tube having a plurality of cathodes and a plurality of control electrodes, different pairs of the cathode and control-electrode circuits being individually responsive to different color signals, as will be explained more fully hereinafter, and including an arrangement for directing the beams emitted from the cathodes individually onto different phosphors for developing different primary colors. Such a tube is more fully described in an article entitled "General Description of Receivers for the Dot-Sequential Color Television System Which Employ Direct-View Tri-Color Kinescopes," in the RCA Review for June 1950, at pages 228–232, inclusive. It should be understood that other suitable types of color-television image-reproducing devices may be employed.

An output circuit of the video-frequency amplifier 13 is also coupled through a modulated subcarrier wave-signal amplifier 18, which has a pass band of the order of 2.3–4.2 megacycles, through a pair of input terminals 19, 19, to a pair of resonant circuits in the matrixing apparatus 16, which circuits will be described more fully hereinafter. An output circuit of the detector 12 is also coupled through a synchronizing-signal separator 21 to a line-scanning generator 22 and a field-scanning generator 23, output circuits of the latter units being coupled, respectively, to line-deflection and field-deflection windings of the image-reproducing device 17. Output circuits of the synchronizing-signal separator 21 and the line-scanning generator 22 are coupled through a gated color burst signal amplifier 24 to a phase-control system 25. An input circuit of the system 25 is also coupled through a pair of terminals 26, 26 to a tuned circuit in the matrixing apparatus 16 in a manner to be described more fully hereinafter, while the output circuit of the system 25 is coupled to a reference-signal generator 27 which has the output circuit thereof coupled through a pair of terminals 28, 28 to the last-mentioned tuned circuit in the unit 16. The generator 27 develops a sine-wave reference signal preferably having the frequency of the aforementioned subcarrier wave signal, that is, a frequency of approximately 3.6 megacycles and having a predetermined phase with respect to such subcarrier wave signal.

The AGC supply of the unit 12 is connected through the conductor identified as AGC to input terminals of one or more of the stages in the unit 10 to control the gains of such stages for maintaining the signal input to the detector 12 within a relatively narrow range for a wide range of received signal intensities. A sound-signal reproducing unit 29 is also coupled to an output circuit of the unit 10 and may include stages of intermediate-frequency amplification, a sound-signal detector, stages of audio-frequency amplification, and a sound-reproducing device.

It will be understood that the various units thus far described, with the exception of those in the matrixing apparatus 16, may be of any conventional construction and design, the details of such units and circuit elements being well known in the art and requiring no further description.

*General Operation of Receiver of FIG. 1*

Considering briefly now the operation of the receiver of FIG. 1 as a whole, a desired composite television signal preferably of the constant-luminance type is intercepted by the antenna system 11, is selected, amplified, converted to an intermediate frequency, and further amplified in the unit 10, and the video-frequency modulation components thereof are derived in the detector 12 and amplified by the unit 13. These video-frequency modulation components comprise synchronizing components, the aforementioned modulated subcarrier wave signal or chrominance signal, and a luminance or brightness signal. The luminance or brightness signal is translated through the delay line 14, is further amplified in the unit 15, and applied through the pair of terminals 20, 20 to circuits in the matrixing apparatus 16 in a manner to be described more fully hereinafter. The modulated subcarrier wave signal or chrominance signal is amplified in the unit 18 and applied through the pair of input terminals 19, 19 to a pair of resonant circuits in the unit 16 in a manner to be described more fully hereinafter. The synchronizing components, including line-frequency and field-frequency synchronizing signals as well as a color burst signal for synchronizing the operation of the detector for deriving the color signals in the unit 16, are separated from the video-frequency components, and the line-frequency and the field-frequency components are separated from each other in the synchronizing-signal separator 21. The line-frequency and field-frequency synchronizing components are applied, respectively, to the units 22 and 23 to synchronize the operation of these generators with the operation of related units at the transmitter. These generators supply signals of saw-tooth wave form which are properly synchronized with respect to the transmitted signal and are applied to the line-deflection and field-deflection windings in the image-reproducing device 17 to effect a rectilinear scanning of the image screen in the device 17. The color burst signal, which is substantially a few cycles of an unmodulated portion of the subcarrier wave signal having a desired reference phase, is applied to the phase-control system 25 through the gated amplifier 24 during the line-blanking period and, in the well-known manner is employed by unit 25 to control the frequency and phasing of the signal developed in the signal generator 27. The amplifier 24 is rendered conductive during the line-blanking period by a control signal applied thereto from the output circuit of the generator 22. The signal developed in the generator 27 is applied through the pair of terminals 28, 28 to circuits in the matrixing apparatus 16 and, with other applied signals, is employed to effect derivation in the unit 16 of a pair of signals, predominantly color-difference signals *R—Y* and *B—Y*, representative respectively of the colors red and blue. This derivation will be explained more fully hereinafter. As will also be described at such time, such color-difference signals combine in the apparatus 16 with the luminance signal Y supplied to terminals 20, 20 to develop color signals R, G, and B representative, respectively, of the red, green, and blue of the derived image. The signals R, G, and B are applied to different ones of the control-electrode circuits of the image-reproducing device 17 by way of the terminals 50B, 50G, and 50R individually to control the intensity of the different beams in the device 17. This intensity modulation of the cathode beams and the geometry of portions of the device 17 result in an excitation of different color phosphors on the image screen of the device 17 which causes a color image to be reproduced on that screen.

The automatic-gain-control or (AGC) signal developed in the unit 12 is effective to control the amplification of one or more of the stages in the unit 10, thereby to maintain the signal input to the detector 12 and to the sound-signal reproducing apparatus 29 within a relatively narrow range for a wide range of received signal intensities. The sound-signal modulated wave signal having been selected and amplified in the unit 10 is applied to the sound-signal reproducing apparatus 29. Therein it is further amplified and detected to derive the sound-signal modulation components which may receive further amplification and be utilized to reproduce sound in the sound-reproducing device in the unit 29.

*Description of Matrixing Apparatus of FIG. 1*

The matrixing apparatus 16 of FIG. 1 includes a circuit for supplying a pair of signals individually representative of unlike colors of an image, more specifically, a circuit for supplying *R—Y* and *B—Y* color-difference signals. Such supply circuit includes a transformer having a pair of primary circuits 41 and 42 connected in series with a condenser 40 to the output circuit of the subcarrier wave-signal amplifier 18 through the pair of terminals 19, 19. The transformer also has a secondary circuit 43 coupled to a pair of synchronous detectors 46 and 47 for developing in the output circuits of such detectors the *R—Y* and *B—Y* color-difference signals, respectively. The tuned circuits 41 and 42 are broadly resonant at the frequency of the subcarrier wave signal to have a pass band of approximately 2.3–4.2 megacycles The coupling between these circuits is slightly greater than critical. The units 41 and 43 comprise one channel for the modulated subcarrier wave signal having well-defined amplitude-translation and phase-translation characteristics for developing in the network 43 a wave signal modulated at a predetermined phase by the I signal components. Due to the tuned coupling of the networks 41 and 43, the signals in these circuits have quadrature-phase relations. The tuned circuit 42 is coupled to an intermediate tap of the network 43 and is broadly resonant having a pass band of approximately 3–4.2 megacycles for translating the modulated subcarrier wave signal and 0.6 megacycle side bands thereof. The transfer impedance of the circuit 42 is proportioned with respect to the transfer impedance of the circuits 41 and 43 so that the signals developed in the networks 43 and 42 have specific relative intensities for reasons to be explained more fully hereinafter. The circuit 42 is arranged to effect no phase shift of the signal translated therethrough so that with respect to a reference phase the subcarrier wave signal translated through the circuit 42 has the Q modulation components at the same phase as the I modulation components of the wave signal in the circuit 43.

The detectors 46 and 47 are substantially identical. Each detector includes a multielectrode tube, for example, a pentode. The first control electrodes in these tubes are individually connected to different end terminals of the network 43 and the third control electrodes are connected together and to a resonant circuit 54 in the output circuit of the generator 27. The circuit 54 is tuned to the frequency of the signal developed in the generator 27, specifically, to a frequency of approximately 3.6 megacycles. The cathodes of the two detector tubes are connected together through a voltage divider 69, the variable tap of which is connected to ground. Intermediate electrodes of the two tubes are connected to a source of potential +B and by-passed to ground for signal frequencies. The anode circuits of the two detectors are identical and a detailed description of one will apply to the other. The anode of the tube 51 is coupled in cascade through a parallel-tuned circuit 58, an inductor 59, a resistor 60, another inductor 61, a condenser 62, and a parasitic-suppression resistor 63 to a control-electrode circuit of a matrixing amplifier 48R. The anode of the tube in the detector circuit 47 is similarly coupled to a control-electrode circuit of a matrixing amplifier 48B. The tuned circuit 58 is resonant at substantially 3.6 megacycles. The circuit 58, the inductor 59, and the resistor 60 together with a pair of condensers 65 and 66 coupled directly from the anode to ground and from the junction of the inductor 59 and the resistor 60 to ground, respectively, comprise a low-pass filter network for translating signals having a maximum frequency of the order of 1.3 megacycles to the control-electrode circuit of the matrix amplifier 48R. The junctions of the inductors 59 and resistors 60 in the two anode circuits are coupled through a cross-coupling resistor 67 for a purpose to be considered more fully hereinafter.

The matrixing apparatus 16 of FIG. 1 also includes a plurality of electron-discharge devices each having at least three electrodes of different species. Move specifically, such devices comprise the matrixing amplifiers 48R, 48G, and 48B each including a pentode, such as the pentode 64 in the amplifier 48R, having a cathode, an anode, and at least one grid or control electrode. Each of the amplifiers 48R, 48G, and 48B also includes a suppressor electrode connected to ground and a screen electrode coupled to an intermediate tap on a voltage divider comprising a pair of resistors, for example, resistors 74 and 75 connected across a source of potential +B. The screen electrodes are bypassed to ground for signal frequencies by means of a condenser, for example, condenser 76.

The matrixing apparatus also includes means for applying said pair of signals individually to different ones of said electrodes comprising one of said species. More specifically, such means comprises the circuits coupling the control electrodes of the tubes in the amplifiers 48R and 48B to the output circuits of the synchronous detectors 46 and 47, respectively, for applying predominantly $R—Y$ and $B—Y$ color-difference signals to the amplifiers 48R and 48B, respectively. These control-electrode circuits as well as the control-electrode circuit of the tube in the amplifier 48G are also coupled through isolating potential-dropping resistors, such as the resistor 70, to the output circuit of the monochrome-signal amplifier 15 through a pair of terminals 20, 20.

The matrixing apparatus also includes means having an impedance network cross coupling those of the electrodes of the pentodes comprising another of the electrode species, that is, the cathodes for developing from predetermined proportions of the applied signals at one of the cathodes, specifically, the cathode in the amplifier 48G another signal representative of another color, specifically, the signal $G-Y$ representative of green. The impedance network comprises resistors 72 and 91 coupled as load resistors for the cathodes of the tubes in the amplifiers 48R and 48B, respectively, and a pair of resistors 73 and 90 coupled in series between the cathodes of the tubes in the amplifiers 48R and 48B. The junction of the resistors 73 and 90 is coupled to the cathode of the tube in the amplifier 48G. In addition, each of the cathodes of the amplifiers 48R, 48G, and 48B includes a biasing resistor, for example, the resistor 71 coupling the cathode of the amplifier 48R to the control-electrode circuit. As will be explained more fully hereinafter, the resistors 72, 73, 90, and 91 are proportioned to develop a signal at the junction of the resistors 73 and 90 representative of the color-difference signal $G-Y$.

The matrixing apparatus 16 of FIG. 1 also includes a plurality of output circuits individually coupled to different ones of the electrodes comprising a third species of electrodes, that is, individually coupled to the anodes of the electron-discharge devices for developing in the anode output circuits signals individually representative of different ones of three unlike colors of the image. More specifically, each of the output circuits comprises an inductor and a direct-current restorer coupling the anode of each amplifier to a control electrode in the picture tube of the image-reproducing device 17. For example, the anode of the amplifier 48R is coupled through an inductor 79 and a direct-current restorer 49R to one of the control electrodes of the picture tube. Each output circuit also includes a by-pass condenser, such as the condenser 92, for by-passing to ground all frequencies above approximately 1.3 megacycles. Each anode circuit also includes a resistor, such as the resistor 77, and a resonant circuit tuned approximately to the frequency of the subcarrier wave signal, such as the resonant circuit 78 coupled between the anode and a source of +B potential.

*Explanation of Operation of Matrixing Apparatus 16 of FIG. 1*

Prior to considering in detail the operation of the matrixing apparatus 16 of FIG. 1, it will be helpful to consider the relationships of the color-difference signals $R-Y$, $B-Y$, and $G-Y$ and of the modulation components I and Q both in phase and magnitude as they appear as modulation components of the subcarrier wave signal developed in the output circuit of the amplifier 18. FIG. 2*a*, which represents a vector diagram of the phase relation of these components, will assist in such consideration. It is desired ultimately to obtain the color-difference components $R-Y$, $B-Y$ and $G-Y$. However, the components which are normally derived initially from the subcarrier wave signal and then matrixed to develop the $R-Y$, $B-Y$, and $G-Y$ components are the components I and Q. The component I prior to being utilized to modulate the subcarrier wave signal at the transmitter has a band width of approximately 1.3 megacycles while the component Q has a band width of approximately 0.6 megacycle. The components I and Q are utilized for color transmission and derivation because the colors represented by Q are colors to which the eye has less acuity with respect to detail than are the colors represented by I. Therefore, the colors represented by Q are transmitted with relatively narrow band widths while those represented by I are transmitted with much wider band widths. To minimize cross talk, the modulated subcarrier wave is transmitted and received with the Q signal as a double side-band modulation component thereof while the subcarrier wave signal has only a double side-band modulation component representative of the low-frequency component of the I signal, that is, representative of the component thereof having a band width of 0.6 megacycle. The component of the I signal between 0.6 and 1.3 megacycles is transmitted as only a single side-band modulation component of the modulated subcarrier wave signal. The signals I and Q modulate the subcarrier wave signal at quadrature phases on each cycle of such wave signal in the manner described in the aforementioned "Electronics" article.

At the receiver, the operation of the synchronous detectors could be so controlled as to derive directly the $R-Y$, $B-Y$, and, if desired, $G-Y$ components from the received subcarrier wave signal. However, such derivation would not be advantageous since the higher frequency I components as thus derived would tend not to faithfully represent the transmitted single side-band I components because of quadrature cross talk. Therefore, it is beneficial to derive the I and Q signals utilizing the double side-band transmission and band limitation of the Q signal to minimize the cross talk between the derived signals. However, it is desired, if possible, to obtain the advantages provided by the I and Q signals while directly deriving from the modulated subcarrier wave signal the $R-Y$ and $B-Y$ components. In matrixing apparatus 16 of FIG. 1 direct derivation of the $R-Y$ and $B-Y$ components is effected while retaining the benefits provided by the double side-band transmission of the narrower band width Q signal and the single side-band transmission of the wider band width I signal.

As is evident from the vector diagram of FIG. 2*a*, an $R-Y$ signal includes predetermined proportions of positive I and Q signals while a $B-Y$ signal includes other predetermined proportions of positive Q and minus I signals. These relationships may be expressed as follows:

$$R-Y=0.62Q+0.96I \qquad (1)$$

$$B-Y=1.70Q-1.10I \qquad (2)$$

Therefore, if a subcarrier wave signal having an intensity of 0.96 with respect to any arbitrary scale and with the modulation component I at, for example, 0° phase with respect to an arbitrary phase reference, is combined with a band limited subcarrier wave signal having an intensity of 0.62 and with the Q component of such wave signal at 0° phase with respect to the same reference phase, then it is apparent that the combination of the two wave signals with such phase relations of the I and Q signals, that is, with the signals in phase with each other and with the intensities just mentioned will develop a subcarrier wave signal effectively modulated at such phase, that is, at 0° phase, with an $R-Y$ component. It is to be understood that in such combination of the subcarrier wave signals, the benefits of double side-band transmission of the narrower band width Q signal and of single side-band transmission of the wider band width I signal are retained and, thus, the $R-Y$ signal on the resultant subcarrier wave signal has no more cross talk than would be in such signal if the I and Q components had first been derived and the Q component band limited and then the derived components combined to develop the $R-Y$ signal. A similar relationship exists for the $B-Y$ color-difference signal developed by combinations of subcarrier wave signals having the I and Q components in-phase and with proper relative intensities as defined by Equation 2 above. The networks 41–43, inclusive, of FIG. 1 develop, in the output circuits of the network 43, such subcarrier wave signals of proper relative intensities modulated by the $R-Y$ and $B-Y$ components. The wave signals combined in the network 43 have the I and Q modulation components thereof at the same phase so that these components algebraically add in the network 43.

Referring now to FIG. 1, the subcarrier wave signal developed in the output circuit of the amplifier 18 is applied through the pair of terminals 19, 19 and the condenser 40 to the tuned circuits 41 and 42. The modulated subcarrier wave signal or second signal developed across the tuned circuit 42 may be considered to have the I and Q modulation components thereof in the relationship represented by the vectors of FIG. 2*b*. As has been previously stated, the pass band of the tuned circuit 42 is such as to be approximately 3.0–4.2 megacycles centered on the 3.6 megacycle mean frequency of the subcarrier wave signal. Thus, the pass band of the tuned circuit 42 is such as to translate the double side-band of the Q modulation component of the wave signal.

The signal developed in the tuned circuit 41 is coupled to the tuned circuit 43 and, because of such coupling, there is a 90° phase shift in such signal so that, with respect to the same phase reference, the signals developed in the tuned circuit 43 have the modulation components I and Q thereof in the relationship represented by the vector diagram of FIG. 2*c*. The network including the tuned circuits 41 and 43 is proportioned to have a pass band equal to that of the total band width for the I modulation component of the subcarrier wave signal, that is, approximately a pass band of 2.3–4.2 megacycles. This pass band is wide enough to translate a 0.6 megacycle double side-band modulation component of the 3.6 megacycle subcarrier wave signal and a 0.7 megacycle single side-band component in the frequency range 2.3–3 megacycles. Considering the vector diagrams of FIGS. 2*b* and 2*c*, it is seen that the subcarrier wave signals having I and Q modulation components at 0° can be combined to develop a resultant subcarrier wave signal having the sum of the I and Q components as a modulation component at 0°. If the transfer impedances of the circuits 41, 43 and of the circuit 42 are properly proportioned, the vectors I and Q in FIGS. 2*b* and 2*c* can be made to have the relative intensities 0.96 and 0.62. The subcarrier wave signal having a 0.62Q component and the subcarrier wave signal having a 0.96I component combine to develop a subcarrier wave signal which is effectively modulated at the 0° phase point by an $R-Y$ component as defined by Equation 1. Actually, the portion of the tuned circuit 43 in which the impedance is proportioned to develop a subcarrier wave signal having the 0.96I component is that portion between the tapped point on the inductor in such circuit and the upper terminal 80 of such circuit. The impedance of the circuit 42 is proportioned to develop a subcarrier wave signal having the 0.62Q component. Consequently, the signal developed between the tapped point and the ungrounded terminal 80 is combined with the signal developed in the tuned circuit 42 to develop at the terminals 80, 80 a signal modulated at the 0° phase point by an $R-Y$ color-difference signal including all of the beneficial characteristics of the I and Q signals.

Similarly, to develop the $B-Y$ component there should be combined a minus I signal and a plus Q signal. Therefore, the transfer impedance between the input circuit of circuit 41 and the output circuit including the tap point in the tuned circuit 43 and the ungrounded one of the terminals 81, 81 is proportioned with respect to the impedance of the single tuned circuit 42 to combine the proper proportions of minus I and plus Q signals as defined by Equation 2 above to develop another wave signal at the pair of terminals 81, 81 modulated at the 0° phase point by a $B-Y$ color-difference signal including all of the beneficial characteristics of the I and Q signals. The details of such proportioning and the values of circuit elements for a specific embodiment of the invention will now be considered.

In view of the relationships expressed for $R-Y$ and $B-Y$ by Equations 1 and 2 above, an initial approach in proportioning the transfer impedances of the tuned circuits 41, 43 and of the circuit 42 would be to consider the total transfer impedance of the tuned circuits 41 and 43 as equal to 0.96+1.10 or approximately 2.06 with respect to any arbitrary impedance scale. It is seen that the terms 0.96 and 1.10 are the coefficients of I in Equations 1 and 2. By so proportioning the transfer impedance of the circuits 41 and 43, the tap point in the circuit 43 can be such as to give relative transfer impedances of 0.96 for the upper portion and 1.10 for the lower portion of the circuit 43. However, the Q signal developed across the tuned circuit 42 has only one intensity whereas, in order to combine with the I signals to develop $R-Y$ and $B-Y$ signals as defined by Equations 1 and 2, the Q signal should have an intensity of 0.62 for $R-Y$ and of 1.70 for $B-Y$. Thus, if with respect to the same arbitrary impedance scale the transfer impedance of the tuned circuit 42 is proportioned to be 0.62, then the gain of the system for translating the subcarrier modulated by the $B-Y$ signal should be proportioned so that 0.62Q multiplied by such gain equals 1.70Q. In order to permit such relative gain in the channel for translating the $B-Y$ signal, the intensity of the I component to be combined with the Q component for developing the subcarrier wave signal modulated by $B-Y$ has to be initially reduced by the amount of such gain so that the combination of the I and Q components for the subcarrier wave signal modulated by $B-Y$ multiplied by the gain for the $B-Y$ signal will give the relationship expressed by Equation 2, that is, an effective combination of 1.70Q and 1.10I. Therefore, to proportion the transfer impedances of the circuits 41, 43 and of the circuit 42, it may initially be assumed that the transfer impedance of the circuit 42 with respect to an arbitrary impedance scale is 0.62. With respect to the same scale, the transfer impedance of the tuned circuits 41 and 43 should be $0.96+1.10/\mu$ where $\mu$ represents the relative gain of the channels for translating the signal representative of $B-Y$ with respect to that for translating the signal representative of $R-Y$ and is equal to 1.70/0.62. The tap point on the inductor of the circuit 43 is such as to give an effective transfer impedance of 0.96 between the tap and the upper terminal of the circuit 43 and an effective impedance of $1.10/\mu$ between the tap and the lower terminal of such circuit. In the matrixing apparatus of FIG. 1, the synchronous detector 47 is proportioned to have a gain $\mu$ with respect to the synchronous detector 46 by adjusting the resistor 69.

The subcarrier wave signal developed between the terminals 80, 80 in the output circuit of the tuned circuit 43 and modulated by the $R-Y$ component is applied to the control electrode of the tube in the synchronous detector 46 while the subcarrier wave signal developed at the terminals 81, 81 and modulated by the *B—Y* component is applied to the control electrode of the corresponding tube in the synchronous detector 47. The *R—Y* modulation component on the subcarrier wave signal applied to the detector 46 is at the same phase as the *B—Y* component on the subcarrier wave signal applied to the detector 47 and, thus, the 3.6 megacycle signal developed in the tuned circuit 54 may be properly phased to derive predominantly the *R—Y* components at the output of the detector 46 and predominantly the *B—Y* components at the output of the detector 47 by heterodyning of the reference signal and the modulated subcarrier wave signals in these detectors. The predominant *R—Y* component is reduced in frequency to a signal having a maximum frequency of approximately 1.3 megacycles by the anode load circuit of the tube 51 and is applied to the control electrode of the tube 64 in the signal-combining amplifier 48R. Similarly, the predominant *B—Y* component is limited to frequencies below approximately 1.3 megacycles and applied to the control electrode of the corresponding tube in the signal-combining amplifier 48B.

The matrix amplifiers 48R and 48B utilize the *R—Y* and *B—Y* color-difference signals applied thereto to develop R and B color signals of adequate intensities in the anode output circuits thereof and to develop a *G—Y* color-difference signal in an impedance network cross coupling the cathodes thereof. The latter *G—Y* color-difference signal is employed in the amplifier 48G to develop in the anode circuit thereof a color signal G of adequate intensity. The color signals R, B, and G representing, respectively, the red, blue, and green primary colors of the televised image are utilized in the image-reproducing device 17 to reproduce such televised image in color. The matrixing of the predominant *R—Y* and *B—Y* signals to develop a *G—Y* signal is effected without loss in the gains of the amplifiers 48R, 48G, and 48B, without cross coupling of the anode output circuits of these amplifiers, and without delay of the output *G—Y* signal with respect to the corresponding *R—Y* and *B—Y* signals.

The amplifiers 48R and 48B operate in a conventional manner to combine the color-difference signals and luminance signals applied to the control electrodes thereof to develop, respectively, the color signals R and B in the anode output circuits thereof. The cathode circuits of the amplifiers 48R and 48B develop, respectively *R—Y* and *B—Y* color-difference signals of specific relative intensities across the load resistors 72 and 91, respectively. These *R—Y* and *B—Y* color-difference signals are combined by means of the resistors 73 and 90 to develop a *G—Y* color-difference signal at the cathode of the amplifier 48G. The amplifier 48G utilizes such *G—Y* signal and a luminance signal Y applied to the control electrode thereof from the output circuit of the amplifier 15 to develop the color signal G in the anode circuit of the amplifier 48G.

The relative magnitudes of the resistors 72, 73, 90, and 91 are determined by the relative intensities of the *R—Y* and *B—Y* signals needed to develop a *G—Y* signal. In terms of *R—Y* and *B—Y*, a *G—Y* signal is defined as follows:

$$G-Y=0.51(R-Y)-0.19(B-Y) \qquad (3)$$

The cathode load resistor 72 of the tube 64 in the amplifier 48R and the resistor 73 are proportioned to develop an *R—Y* component equal in intensity, with respect to unity scale for the brightness signal, to the coefficient of *R—Y* in Equation 3. Similarly, the resistors 90 and 91 in the amplifier 48B are proportioned to develop a *B—Y* component having an intensity as represented by the coefficient of the *B—Y* component in Equation 3. The relative magnitudes of the resistors 73 and 90 are such that a *G—Y* signal is developed at the junction thereof, that is, at the cathode of the amplifier 48G. Because the cross coupling effected by the resistors 73 and 90 tends to affect the color purity of the R and B signals developed in the output circuits of the amplifiers 48R and 48B, respectively, a compensating cross coupling is effected in the control-electrode input circuits of these two amplifiers by means of the cross coupling resistor 67.

While applicant does not wish to be limited to any particular circuit values for the embodiment of the invention described above, the following is a set of values which may be utilized in the matrixing apparatus of FIG. 1.

| | |
|---|---|
| Resistors of circuits 41 and 43 | 7500 ohms. |
| Resistor of circuit 42 | 1600 ohms. |
| Resistors 52 and 53 | 330 ohms. |
| Resistor 53 | 100 ohms. |
| Resistor 57 | 22 kilohms. |
| Resistor 60 | 12 kilohms. |
| Resistor 63 | 100 ohms. |
| Resistor 67 | 200 kilohms. |
| Resistor 68 | 220 ohms. |
| Resistor 69 | 250 ohms. |
| Resistor 70 | 2700 ohms. |
| Resistor 71 | 1 megohm. |
| Resistor 72 | 330 ohms. |
| Resistor 73 | 68 ohms. |
| Resistor 74 | 3500 ohms. |
| Resistor 75 | 5000 ohms. |
| Resistor 77 | 4100 ohms. |
| Condensers 39 and 76 | 8 microfarads. |
| Condenser 40 | 1000 micromicrofarads. |
| Condensers of circuits 41, 42, and 43 | Sufficient to resonate inductors of those circuits to 3.6 megacycles. |
| Condenser of circuit 58 | 1–3 micromicrofarads. |
| Condenser 62 | 0.47 microfarad. |
| Condenser 65 | 5–20 micromicrofarads. |
| Condenser 66 | 3–12 micromicrofarads. |
| Condenser of circuit 78 | 10 micromicrofarads. |
| Condenser 92 | 5–20 micromicrofarads. |
| Inductors of circuits 41 and 43 | 97 microhenries. |
| Inductor of circuit 42 | 21 microhenries. |
| Inductor of circuit 58 | 700 microhenries. |
| Inductor 59 | 3.6 millihenries. |
| Inductor 61 | 110 microhenries. |
| Inductor of circuit 78 | 90 microhenries. |
| Inductor 79 | 300 microhenries. |
| Tube 51 | Type 6AS6. |
| Tube 64 | Type 6AH6. |
| Potential +B | 215 volts. |

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. Matrixing apparatus for color-television signals comprising: means for supplying a pair of signals individually representative of unlike colors of an image; a plurality of electron-discharge devices each having at least three electrodes of different species; means for applying said pair of signals individually to different ones of said electrodes comprising one of said species; passive circuit means, including an impedance network cross coupling those of said electrodes comprising another of said species, for developing from predetermined proportions of said applied signals at one of said electrodes of said other species another signal representative of another color; and a plurality of output circuits individually coupled to different ones of those of said electrodes comprising a third of said species for developing in said output circuits output signals individually representative of different ones of three unlike colors of said image.

2. Matrixing apparatus for color-television signals comprising: means for supplying predominantly $R-Y$ and $B-Y$ color-difference signals representative, respectively, of red and blue in an image; a plurality of electron-discharge devices each having at least three electrodes of different species; means for applying said predominantly $R-Y$ and $B-Y$ signals individually to different ones of said electrodes comprising one of said species; passive circuit means, including an impedance network cross coupling those of said electrodes comprising another of said species, for developing from predetermined proportions of said applied signals at one of said electrodes of said other species a $G-Y$ signal representative of green; and a plurality of output circuits individually coupled to different ones of those of said electrodes comprising a third of said species for developing in said output circuits output signals individually representative of different ones of three unlike colors of said image.

3. Matrixing apparatus for color-television signals comprising: means for supplying predominantly R—Y and B—Y color-difference signals representative, respectively, of red and blue in an image and for supplying a luminance signal Y; a plurality of electron-discharge devices each having at least three electrodes of different species; means for applying said predominantly R—Y and B—Y signals individually to different ones of said electrodes comprising one of said species and said Y signal to all of said electrodes comprising one of said species; means, including an impedance network cross coupling those of said electrodes comprising another of said species, for developing from predetermined proportions of said predominantly R—Y and B—Y applied signals at one of said electrodes of said other species a G—Y signal representative of green; and a plurality of output circuits individually coupled to different ones of those of said electrodes comprising a third of said species for developing in said output circuits output signals R, G, and B representative, respectively, of red, green, and blue in said image.

4. Matrixing apparatus for color-television signals comprising: means for supplying a pair of signals individually representative of unlike colors of an image; a plurality of electron-discharge devices each having at least a cathode, an anode, and a control electrode; means for applying said pair of signals individually to different ones of said control electrodes; means, including an impedance network cross coupling said cathodes, for developing from predetermined proportions of said applied signals at one of said cathodes another signal representative of another color; and a plurality of output cricuits individually coupled to different ones of said anodes for developing in said output circuits output signals individually representative of different ones of three unlike colors of said image.

5. Matrixing apparatus for color-television signals comprising: means for supplying a pair of signals individually representative of unlike colors of an image; three electron-discharge devices each having at least three electrodes of different species; means for applying said pair of signals individually to different ones of said electrodes comprising one of said species in a pair of said devices; passive circuit means, including an impedance network cross coupling those of said electrodes comprising another of said species in said pair of devices and connected to said electrode of said other species in the third of said devices, for developing from predetermined proportions of said applied signals at said electrode of said other species in the third of said devices another signal representative of another color; and a plurality of output circuits individually coupled to different ones of those of said electrodes comprising a third of said species for developing in said output circuits output signals individually representative of different ones of three unlike colors of said image.

6. Matrixing apparatus for color-television signals comprising: means for supplying a pair of signals individually representative of unlike colors of an image; a plurality of electron-discharge devices each having at least three electrodes of different species; means for applying said pair of signals individually to different ones of said electrodes comprising one of said species; passive circuit means, including individual load resistors for a pair of said electrodes comprising another of said species and a resistor circuit interconnecting said load resistors, for developing from predetermined proportions of said applied signals at one of said electrodes of said other species another signal representative of another color; and a plurality of output circuits individually coupled to different ones of those of said electrodes comprising a third of said species for developing in said output circuits output signals individually representative of different ones of three unlike colors of said image.

7. Matrixing apparatus for color-television signals comprising: means for supplying a pair of signals individually representative of unlike colors of an image; three electron-discharge devices each having at least a cathode, an anode, and a control electrode; means for applying said pair of signals individually to different ones of said control electrodes in a pair of said devices; means, including an impedance network cross coupling said cathodes in said pair of devices and connected to said cathode in the third of said devices, for developing from predetermined proportions of said applied signals at said cathode in said third of said devices another signal representative of another color; and a plurality of output circuits individually coupled to different ones of said anodes for developing in said output circuits output signals idividually representative of different ones of three unlike colors of said image.

8. Matrixing apparatus for color-television signals comprising: means for supplying predominantly R—Y and B—Y color-difference signals representative, respectively, of red and blue in an image; a plurality of electron-discharge devices each having at least a cathode, an anode and a control electrode; means for applying said predominantly R—Y and B—Y signals individually to different ones of said control electrodes; means, including an impedance network cross coupling said cathodes, for developing from predetermined proportions of said predominantly R—Y and B—Y applied signals at one of said cathodes a G—Y signal representative of green; and a plurality of output circuits individually coupled to different ones of said anodes for developing in said output circuits individual ones of output signals representative of red, green, and blue in said image.

9. Matrixing apparatus for color-television signals comprising: means for supplying predominantly $R-Y$ and $B-Y$ color difference signals representative, respectively, of red and blue in an image and for supplying a luminance signal Y; a plurality of electron-discharge devices each having at least a cathode, an anode, and a control electrode; means for applying said predominantly $R-Y$ and $B-Y$ signals individually to different ones of said control electrodes and said Y signal to all of said control electrodes; means, including an impedance network cross coupling said cathodes, for developing from predetermined proportions of said predominantly $R-Y$ and $B-Y$ applied signals at one of said cathodes a $G-Y$ signal representative of green; and a plurality of output circuits individually coupled to different ones of said anodes for developing in said output circuits output signals R, G, and B representative, respectively, of red, green, and blue in said image.

10. Matrixing apparatus for color-television signals comprising: means for supplying predominantly $R-Y$ and $B-Y$ color-difference signals representative, respectively, of red and blue in an image and for supplying a luminance signal Y; three electron-discharge devices each having at least a cathode, an anode, and a control electrode; means for applying said predominantly $R-Y$ and $B-Y$ signals individually to different ones of said control electrodes in a pair of said devices and said Y signal to all of said control electrodes; means, including an impedance network cross coupling said cathodes in said pair of devices and connected to said cathode in the third of said devices, for developing from predetermined proportions of said predominantly $R-Y$ and $B-Y$ applied signals at said cathode in the third of said devices a $G-Y$ signal representative of green; and a plurality of output circuits individually coupled to different ones of said anodes for developing in said output circuits output signals R, G, and B representative, respectively, of red, green, and blue in said image.

11. Matrixing apparatus for color-television signals comprising: means for supplying predominantly $R-Y$ and $B-Y$ color-difference signals representative, respectively, of red and blue in an image and for supplying a luminance signal Y; three electron-discharge devices each having at least a cathode, an anode, and a control electrode; means for applying said predominantly $R-Y$ and $B-Y$ signals individually to different ones of said control electrodes in a pair of said devices and said Y signal to all of said control electrodes; means, including individual load resistors for said cathodes in said pair of devices and a resistor circuit interconnecting said load resistors and coupled to said cathode in the third of said devices, for developing from predetermined proportions of said predominantly $R-Y$ and $B-Y$ applied signals at said cathode in the third of said devices a $G-Y$ signal representative of green; and a plurality of output circuits individually coupled to different ones of said anodes for developing in said output circuits output signals R, G, and B representative, respectively, of red, green, and blue in said image.

References Cited in the file of this patent

UNITED STATES PATENTS

| | | |
|---|---|---|
| 2,732,425 | Pritchard | Jan. 24, 1956 |
| 2,745,900 | Parker | May 15, 1956 |
| 2,779,818 | Adler | Jan. 29, 1957 |
| 2,830,112 | Pritchard | Apr. 8, 1958 |
| 2,868,872 | Espenlaub et al. | Jan. 13, 1959 |
| 2,877,347 | Clark | Mar. 10, 1959 |
| 2,974,289 | Cockburn | Mar. 7, 1961 |

FOREIGN PATENTS

| | | |
|---|---|---|
| 1,084,376 | France | Jan. 19, 1955 |

OTHER REFERENCES

RCA Service Data, Model CT–100, April 22, 1954, pp. 31–34.

Electronics, January 1953, pp. 98–104.

Disclaimer 3,056,853.—*Walter C. Espenlaub*, Syosset, N.Y. MATRIXING APPARATUS FOR COLOR-TELEVISION SIGNALS. Patent dated Oct. 2, 1962. Disclaimer filed Mar. 11, 1963, by the inventor and the assignee, *Hazeltine Research, Inc.*, assenting.

Hereby enter this disclaimer to claims 1, 4, 5, and 7 of said patent.

[*Official Gazette May 7, 1963.*]